US012771038B2

(12) United States Patent
Shin

(10) Patent No.: US 12,771,038 B2
(45) Date of Patent: Oct. 20, 2026

(54) MOBILE TERMINAL

(71) Applicant: LG ELECTRONICS INC., Seoul (KR)

(72) Inventor: Minchul Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 329 days.

(21) Appl. No.: 18/288,655

(22) PCT Filed: Apr. 30, 2021

(86) PCT No.: PCT/KR2021/005517
§ 371 (c)(1),
(2) Date: Oct. 27, 2023

(87) PCT Pub. No.: WO2022/231040
PCT Pub. Date: Nov. 3, 2022

(65) Prior Publication Data

US 2024/0222873 A1 Jul. 4, 2024

(51) Int. Cl.
*H01Q 13/02* (2006.01)
*H01Q 1/24* (2006.01)

(52) U.S. Cl.
CPC ............. *H01Q 13/02* (2013.01); *H01Q 1/243* (2013.01)

(58) Field of Classification Search
CPC ......... H01Q 13/02; H01Q 1/243; H04M 1/02; H04M 1/0241; H04M 1/0268; H04M 1/0235; H04M 2250/12
See application file for complete search history.

(56) References Cited

U.S. PATENT DOCUMENTS 8,121,542 B2 2/2012 Zack et al.
2004/0219956 A1* 11/2004 Iwai .......................... H01Q 5/00 455/575.3
2005/0225484 A1* 10/2005 Kuramoto .............. H01Q 1/243 343/702
2008/0100519 A1* 5/2008 Ku .......................... H01Q 1/243 343/702
2008/0211721 A1* 9/2008 Ohba ...................... H01Q 1/243 343/702
2009/0066585 A1* 3/2009 Sato .......................... H01Q 9/16 343/702

(Continued)

FOREIGN PATENT DOCUMENTS

CN 111585002 A 8/2020
JP WO2002054532 A1 * 5/2004 ............. H01Q 1/245

(Continued)

*Primary Examiner* — Dimary S Lopez Cruz
*Assistant Examiner* — Bamidele A Immanuel
(74) *Attorney, Agent, or Firm* — Birch, Stewart, Kolasch & Birch, LLP

(57) ABSTRACT

A mobile terminal including a first frame; a second frame which slides with respect to the first frame; a first horn antenna which is disposed in the first frame; and a second horn antenna which is disposed in the second frame and wirelessly communicates with the first horn antenna. The mobile terminal can omit a physical signal line for transmitting a signal between an electronic component mounted to the first frame and an electronic component mounted to the second frame, and thus can prevent the breakage of the signal line according to sliding movements.

14 Claims, 10 Drawing Sheets

(a)

(b)

(56) References Cited

U.S. PATENT DOCUMENTS

2011/0136551 A1* 6/2011 Wong ..................... H01Q 1/243
455/575.4
2011/0136554 A1* 6/2011 Wong .................. H04M 1/0235
455/575.4
2012/0115336 A1* 5/2012 Kanazawa ............... H01Q 1/48
439/32
2014/0292090 A1* 10/2014 Cordeiro ................. H02J 50/40
307/104
2017/0324135 A1 11/2017 Blech et al.
2017/0358870 A1* 12/2017 Hojjat ...................... H01Q 9/44
2019/0268455 A1* 8/2019 Baek ..................... G06F 1/1652
2020/0127389 A1* 4/2020 Li ........................ H01Q 25/001
2020/0163204 A1* 5/2020 Kim ......................... H01Q 1/44
2020/0373668 A1* 11/2020 Wu ........................ H01Q 9/285
2021/0226344 A1* 7/2021 Wu ........................ H01Q 1/246
2021/0318720 A1* 10/2021 Lin ........................ H01Q 1/243
2021/0320410 A1* 10/2021 Liu ....................... G06F 1/1677
2021/0344122 A1* 11/2021 Kaistha ................ H01Q 19/108
2021/0359395 A1* 11/2021 Kasani ............... H01Q 21/0075
2022/0077600 A1* 3/2022 Sundararajan ........... H01Q 5/42
2022/0109238 A1* 4/2022 Varnoosfaderani ..........................
H01Q 1/2283
2022/0115768 A1* 4/2022 Oh ......................... H01Q 5/328
2022/0181795 A1* 6/2022 Varnoosfaderani ..........................
H01Q 25/001
2022/0285857 A1* 9/2022 Pollayi ................... H01Q 21/24
2022/0352649 A1* 11/2022 Wu .......................... H01Q 9/26
2022/0376394 A1* 11/2022 Huang ................... H01Q 1/246
2023/0017375 A1* 1/2023 Wu .......................... H01Q 5/42
2023/0291123 A1* 9/2023 Kasani ................... H01Q 1/246
2023/0361475 A1* 11/2023 Sun .......................... H01Q 5/48
2023/0395998 A1* 12/2023 Vollmer ................. H01Q 21/26

FOREIGN PATENT DOCUMENTS

JP 4819773 B2 * 11/2011
JP 2013-42376 A 2/2013
KR 10-2019-0115888 A 10/2019
KR 10-2020-0057962 A 5/2020
KR 10-2021-0037429 A 4/2021

* cited by examiner (a)

(b)

(a)

(b)

(a)

(b)

(a)

(b)

MOBILE TERMINAL

CROSS REFERENCE TO RELATED APPLICATION

This application is the National Phase of PCT International Application No. PCT/KR2021/005517, filed on Apr. 30, 2021, which is hereby expressly incorporated by reference into the present application.

BACKGROUND

Technical Field

The present disclosure relates to a mobile terminal, and more particularly, to a mobile terminal that has a flexible display and is capable of extending a size of a screen while the display is scrolled and slid at the same time.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In order to implement various functions, an area of a display unit should be increased, but a size of a mobile terminal should be reduced considering its portability. In order to satisfy the two properties contrary to each other, a bezel located around the display unit was minimized to fill up a front side with the display unit.

Furthermore, there is a need for a mobile terminal that can be easily carried and used by changing a size of the mobile terminal in a manner of varying the size of the mobile terminal.

This trend is accelerating due to the recent emergence of a flexible display unit. However, it is necessary to solve the problem of deteriorating usability due to configuration that is different from the existing form factors.

SUMMARY

A mobile terminal according to one embodiment of the present disclosure is proposed to solve the above problems, and the present disclosure is to provide a mobile terminal that may omit physical structures such as a cable or a flexible substrate by performing signal transmission between two bodies in a wireless communication scheme.

Provided is a mobile terminal including a first frame, a second frame that switches to an extended mode by sliding in a first direction with respect to the first frame or to switches to a basic mode by sliding in a second direction opposite to the first direction, a main board mounted on the second frame, a first electronic component mounted on the first frame, a first horn antenna fixed to the first frame, an auxiliary board that connects the first electronic component and the first horn antenna to each other, and a second horn antenna located on the main board and facing the first horn antenna, wherein the second horn antenna is in wireless communication with the first horn antenna.

The first horn antenna may be located on a rear surface of the first frame and may be oriented in the first direction, and the mobile terminal may further include an antenna cover covering the first horn antenna and located on the rear surface of the first frame.

The antenna cover may protrude from a rear surface of the second frame, and the second frame may further include a concave portion receiving the antenna cover therein in the basic mode.

The antenna cover may include a multi-stage structure with stages overlapping each other in the basic mode and spreading while sliding in the extended mode, and one side of the multi-stage structure may be fixed to the first frame and the other side of the multi-stage structure may be fixed to the concave portion of the second frame to form a shielding passage located between the first horn antenna and the second horn antenna.

The mobile terminal may further include a driving motor located on the second frame, a pinion gear that receives a rotational force of the driving motor, and a rack gear located on the rear surface of the first frame, and at least a portion of the rack gear may be located in front of the antenna cover in the extended mode.

The antenna cover may include multi-stage shells made of a non-conductive material, and EMI paint applied to inner sides of the multi-stage shells.

The second horn antenna may be mounted on the second frame to be oriented in the second direction opposite to the first direction at an end of the concave portion.

The first electronic component may be mounted on the first frame and include at least one of a camera, a receiver, and a proximity sensor located inside the antenna cover.

The mobile terminal may further include a battery mounted on the second frame, a power pin connected to the battery and protruding from a front surface of the second frame facing the first frame, and a power terminal located on the auxiliary board and connected to the power pin.

The power terminal may be elongated in the first direction.

The first frame may include a first rear surface exposed to the outside in the extended mode, and a second rear surface covered by the second frame in the extended mode, and the power terminal may be located on the second rear surface.

The mobile terminal may further include a display unit including a fixed part coupled to a front surface of the first frame and a variable part oriented in the first direction of a first area and bent while surrounding the second frame, and a display driving IC fixed to the first frame and connected to the auxiliary board.

The first horn antenna and the second horn antenna may use a WiGig communication in a 60 GHz band.

Advantageous Effects

In the mobile terminal according to one embodiment of the present disclosure, the data signal between the first electronic component mounted on the first frame and the second electronic component mounted on the second frame may transmit the large capacity of data at the high speed using the horn antenna.

By omitting the flexible substrate or the coaxial cable, which is the physical signal connection means, the space where the flexible substrate and the coaxial cable are folded may be saved, and the disconnection problem may be solved.

In addition, because the power may be transmitted in the physical manner without the bending structure using the power terminal and the power pin, the power may be stably supplied to the first electronic component.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
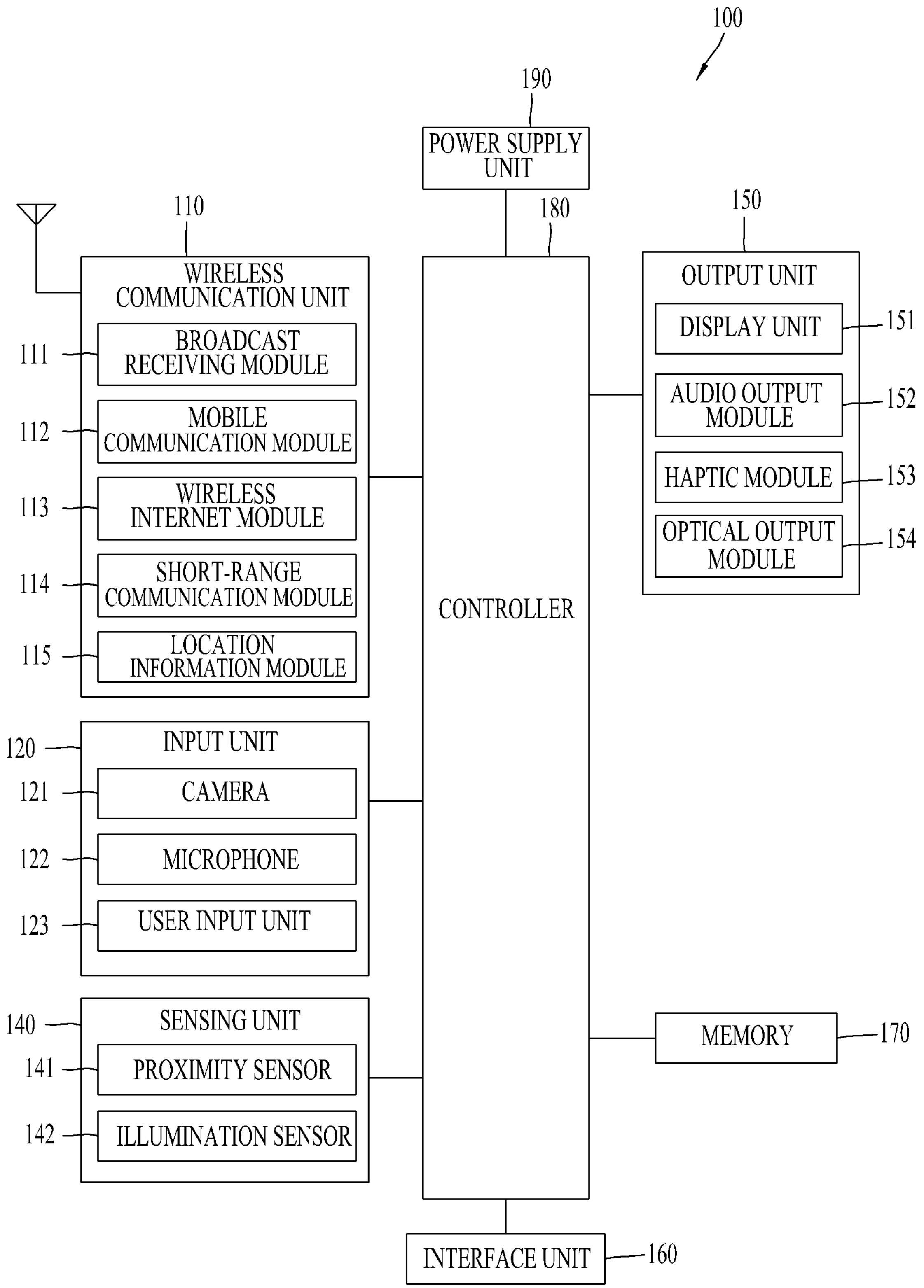
FIG. 1 is a block diagram of a mobile terminal in accordance with the present disclosure.

FIG. 1 is a block diagram of a mobile terminal in accordance with the present disclosure. The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
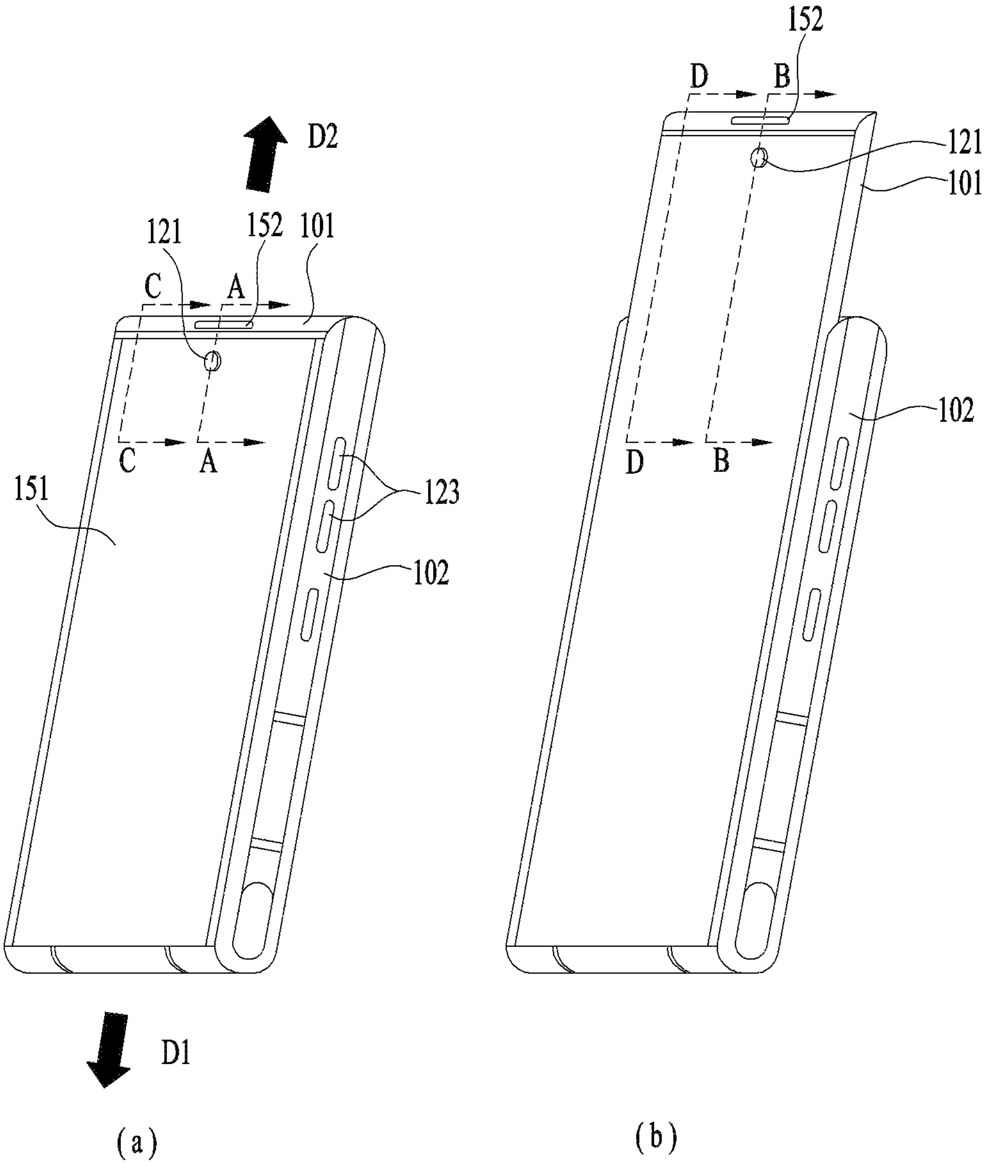
FIG. 2 is a front view of a first state and a second state of a mobile terminal.
Figure 3:
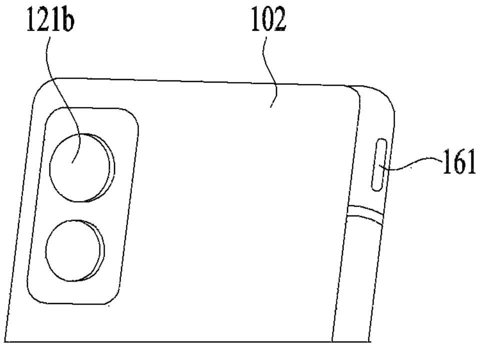
FIG. 3 is a rear view illustrating a first state and a second state of a mobile terminal.
Figure 3:
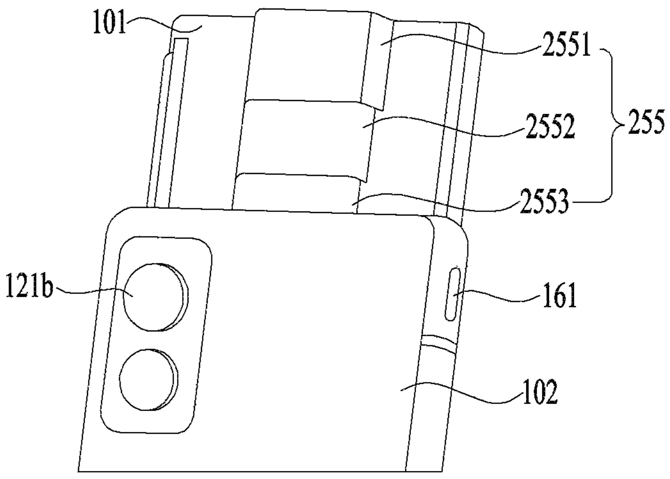

FIGS. 2 and 3 are diagrams showing the mobile terminal 100 that may be varied in size, FIG. 2 is a front view of a first state and a second state of the mobile terminal 100, and FIG. 3 is a rear view illustrating the first state and the second state of the mobile terminal 100. The mobile terminal 100 includes frames 101 and 102 that slide such that the size of the mobile terminal 100 may be changed.

A first frame 101 and a second frame 102 that slides relative to the first frame 101 are included. When the second frame 102 moves in a first direction D1, a state of the mobile terminal 100 is switched to an extended mode (a second state). In addition, when the second frame 102 moves in a second direction opposite to the first direction, the state of the mobile terminal 100 is switched to a basic mode (a first state).

The movement of the second frame 102 is a movement relative to the first frame 101. If the second frame 102 becomes a reference, when the first frame 101 slides in the second direction D2, the mobile terminal 100 switches to the second state extended. When the first frame 101 slides in the first direction D1, the mobile terminal 100 switches to the first state contracted.

If the first frame 101 and the second frame 102 are disposed in top-bottom direction like the present embodiment, a user holds the second frame 102 located at the bottom, so the first frame 101 moves in top direction from the user's perspective. Hence, the mobile terminal 100 may be recognized as extended upward.

In the following description, the direction in which the mobile terminal 100 and the display unit 151 thereof are extended or enlarged is defined as a first direction, and the direction in which the mobile terminal contracts or retracts or is reduced to switch from the second state to the first state is defined as a second direction. A direction perpendicular to the first and second directions is defined as a third direction. Description will be made on the assumption that the first and second directions are horizontal directions and the third direction is a vertical direction. However, depending on the arrangement of the mobile terminal 100, the first and second directions may be vertical directions and the third direction may be a horizontal direction.

(a) in FIG. 2 and (a) in FIG. 3 show the first state that is the basic mode, and (b) in FIG. 2 and (b) in FIG. 3 show the second state that is the extended mode. Even in the extended mode switched as the second frame 102 moves in the first direction, the first frame 101 and the second frame 102 have an overlapping portion.

In the first state, one of the first frame 101 and the second frame 102 may be disposed to surround the other and be disposed outward of the other. The first frame 101 may be disposed outward of the second frame 102 in some embodiments, and the second frame 102 may be disposed outward of the first frame 101 in some embodiments.

In order to extend the mobile terminal 100 while the second frame 102 moves against the first frame 101, the first and second frames 101 an 102 partially overlap each other. At least one side of the first frame 101 and the second frame 102 may include a portion configured to remain inside in the contracted state of the mobile terminal 100 and be exposed externally in the extended state of the mobile terminal 100. A backside of the mobile terminal 100 may include portions configured to be selectively exposed in part on switching to the second state or located inside of another member in the first state. In the present embodiment, the portion of the second frame exposed externally is fixed and the first frame 101 may include a portion selectively exposed.

As shown in (b) in FIG. 2, in the extended second state, an extended front surface (a lower portion in the drawing) of the mobile terminal is covered by the display unit 151 that has moved to a front side from a rear side, so that the inside of the mobile terminal 100 is not exposed.

An area of the display unit 151 located on the front side of the mobile terminal 100 may vary depending on whether the frame 101 and 102 of the mobile terminal 100 is extended. A front side area of the display unit 151 in the second state may have a size greater than that in the first state. The display unit 151 includes a fixed part 151*a* fixed to the front side of the first frame 101 so as to be always located on the front side of the mobile terminal irrespective of the state of the mobile terminal 100 and a variable part 151*b* located on the front side or the backside depending on whether the mobile terminal 100 is extended The fixed part 151*a* is always located on the front side by being coupled to the front side of the first frame 101 of the display unit 151, thereby configuring a portion of the front part. As the fixed part 151*a* is fixed to the first frame 101, it is characterized in maintaining a uniform shape without changing flexibility. On the other hand, the variable part 151*b* means a portion at which an angle of a flexed portion varies or a portion at which a location of a flexed portion is changed. In the second state of the mobile terminal, as the variable part moves to a front side, the fixed part and the variable part simultaneously located at the front part.

The variable part 151*b* includes a lateral part located in a lateral direction of the mobile terminal 100, and a location of the lateral part varies depending on a location of the second frame 102. Based on the lateral part, a size of a region located on the front side and a size of a region located on the backside are changed. Some of the variable part 151*b* may become the front part or the backside part depending on the first or second state.

Based on the mobile terminal 100, the variable part 151*b* is located in the first direction to the fixed part 151*a* and an end portion of the variable part 151*b* is bent in a direction of the backside of the mobile terminal 100 and slides to move on the backside of the second frame 102.

As such, a flexible display unit 151 which is bendable may be used as the display unit such that the position of the display unit may move to front side or rear side.

The flexible display unit 151 may be a display unit capable of maintaining a flat state like a conventional flat panel display and capable of warping, bending, folding, twisting, or rolling like paper. The flexible display unit 151 refers to a display which is manufactured on a thin and flexible substrate and is thus lightweight and robust as not to be easily broken. The flexible display unit according the present disclosure may be bent in a specific direction, and may be arranged such that the curvature thereof may change in the first direction.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display area of the flexible display unit 151 becomes flat.

In a state in which the flexible display unit 151 is deformed by an external force from the basic state (e.g., a state of having a finite radius of curvature, hereinafter referred to as a deformed state), the display area may become a curved face. As shown, information displayed in the deformation state may be visual information output on the curved face.

Such visual information is implemented by independently controlling light emission of sub-pixels arranged in a matrix. The sub-pixel refers to a minimum unit for implementing one color. When external force is applied to the flexible display unit 151, the flexible display unit 151 may be deformed to switch from the default state, which is the flat state, to a bent state, which is not the flat state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to second frames 101 to 102 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may include various kinds of information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The deformation of the flexible display unit 151 may vary depending on the positions of the first frame 101 and the second frame 102. As shown in FIG. 2, since the bending position on the flexible display unit 151 is determined according to the positions of the first frame and the second frame, the bending deformation position of the flexible display unit 151 and the area thereof positioned on the front may be calculated based on the positions of the first frame 101 and the first frame 102 in place of the deformation detection means of the flexible display unit 151.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200, which will be described later.

The flexible display unit 151 of the present disclosure is bent 180 degrees by rolling around a side portion of the mobile terminal 100 facing in the first direction. Accordingly, based on the side portion of the mobile terminal 100, a part of the flexible display unit 151 is disposed on the front of the mobile terminal 100, and the other part of the flexible display unit 151 is disposed on the rear of the mobile terminal 100.

For simplicity, the part of the flexible display unit 151 positioned on the front is called a front face, and the other part of the flexible display unit 151 positioned on the rear is called a rear face.

As illustrated in FIG. 2, the mobile terminal may extend in the first direction or contract in the second direction opposite to the first direction. In this case, the area of the flexible display unit 151 positioned on the front changes. That is, the sizes of the front face and the rear face may be changed according to a change in the state of the mobile terminal.

In addition, the flexible display unit 151 may be rolled on or released at the side portion in the first direction of mobile terminal. Accordingly, the rear face of the display unit 151 moves, so that the size of the front face of the display unit 151 may be adjusted. Since the size of the flexible display unit 151 is determined and the flexible display unit 151 is formed of one continuous body, an area of rear face of the display unit 151 decreases as an area of the front face of the display unit 151 increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100.

Since the variable part **151*b* is flexible, it needs a support structure on its backside to maintain a flat state. To support the backside of the variable part 151*b*, further includes is a rolling hinge capable of maintaining a flat state of the variable part 151*b* as well as enabling flex deformation of the variable part 151*b***.

Figure 4:
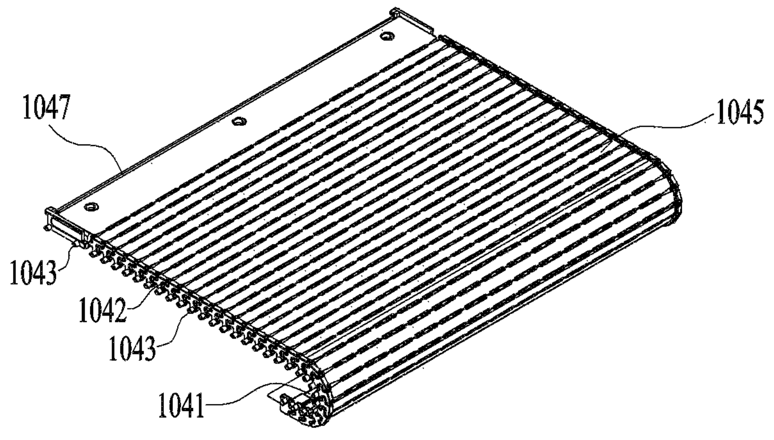
FIG. 4 is a view showing a rolling hinge of a mobile terminal.
Figure 4:
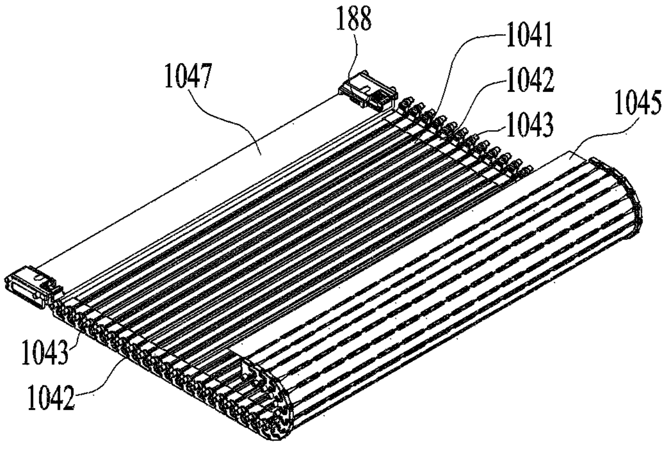

FIG. 4 is a view showing a rolling hinge 104 located on a rear surface of the variable part **151*b*, (a) is a front view, and (b) is a rear view. The rolling hinge 104 may be located on the rear surface of the variable part 151*b* of the display unit 151 and may be bent in the first direction, but may be supported to maintain a flat surface in the third direction perpendicular to the first direction without bending. The rolling hinge 104 may include a plurality of metal bars 1041 (FIG. 21) extending in the third direction, the metal bars 1041 may be arranged side by side in the first direction, and the rolling hinge 104 may be bent together with the variable part 151*b* via an angle change between the metal bars 1041. Hinge edges 1042 (FIG. 21) positioned at both ends of each metal bar 1041 may have a cross-section larger than that of the metal bar 1041 to protect side edges of the display unit. A slide hook 1043 (FIG. 21) protruding from each hinge edge 1042 may move along a slide rail 1027 (FIG. 20) formed on the second frame 102, and the slide hook 1043 and the slide rail 1027 may guide a slide movement of the display unit 151 based on the movement of the second frame 102**.

A slide frame 1047 sliding on a rear surface of the second frame 102 is coupled to the end of the variable part **151*b* of the display unit 151. The slide frame 1047 may be referred to as the metal bar 1041 located at the most end among the metal bars 1041 of the rolling hinge 104, and may move with the display unit 151 based on the slide movement of the variable part like the metal bars 1041**.

However, the slide frame 1047 always slides on the rear surface of the mobile terminal and does not move toward the front surface thereof. Therefore, a width of the slide frame 1047 may be greater than that of the metal bar 1041.

The slide frame 1047 may equally include the slide hooks located at the ends of the metal bar 1041. Because the width of the slide frame 1047 is greater than that of the metal bar 1041, the number of slide hooks 1043 may be greater than one. When the second frame 102 moves in the first direction, the slide frame 1047 moves in the first direction on the second frame 102 at the same time. As a result, a movement distance of the slide frame 1047 to the first frame 101 is twice the movement distance of the second frame 102.

A rolling sheet 1045 located between the metal bars 1041 and the display unit 151 may include a kerf pattern composed of a plurality of slits extending in the third direction to facilitate deformation in the first direction. In the kerf pattern, the slits extending in the third direction are displaced, and deformation in the third direction is limited, but only the bending deformation in the first direction is allowed. As shown in FIG. 4, the kerf pattern may be disposed at a location corresponding to the metal bars 1041.

The rolling sheet 1045 is in contact with the plurality of metal bars 1041 including the slide frame 1047. Therefore, an entirety of the rolling hinge 104 is in an electrically connected state. The rolling sheet 1045 is a portion in direct contact with the display unit 151, and the rolling hinge 104 is able to be coupled to the variable part **151*b* of the display unit by interposing an adhesive sheet between the display unit 151 and the rolling sheet 1045. The adhesive sheet may contain an insulating material to electrically separate the rolling hinge 104 and the display unit 151** from each other.

The second frame 102 may include a roll bracket 1028 (see FIG. 6) including a curved surface therein. A location of the roll bracket 1028 may not be limited, but the roll bracket 1028 may be disposed at an end of the second frame 102 in the first direction to provide a screen of a maximum size on the front surface. The roll bracket 1028 may include the curved surface to allow the display unit 151 to be wound and may have a bar shape extending in the third direction perpendicular to the first direction.

In addition, to prevent damage to the display unit 151 wound around the roll bracket 1028, a bottom frame 1024 disposed at the end of the second frame 102 in the first direction may be included.

The bottom frame 1024 may cover the curved side surface of the display unit 151 and may have a curved surface corresponding to the shape of the curved surface of the display unit 151. The bottom frame 1024 may include a portion made of a metal material and a portion made of an insulating material, and the metal portion may be used as an antenna.

Figure 5:
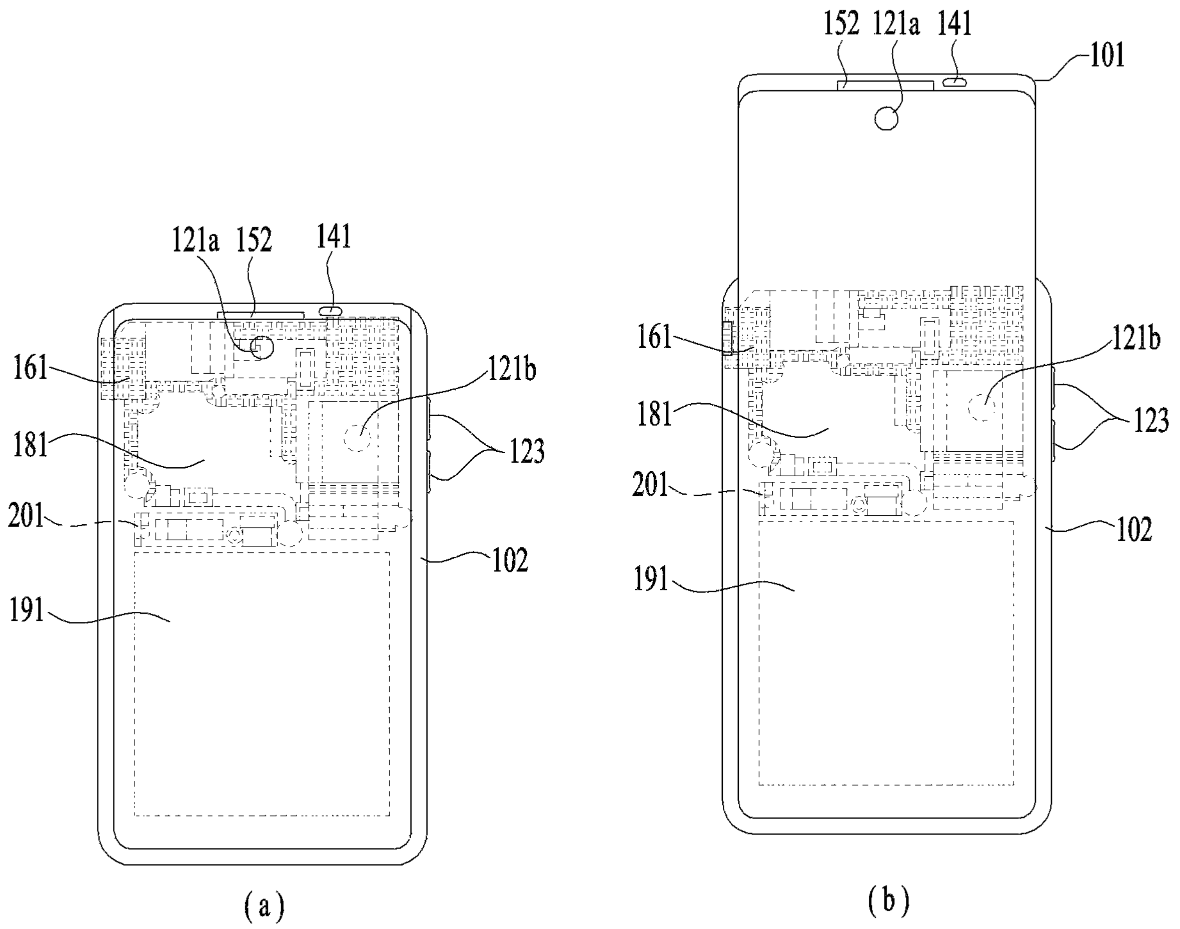
FIG. 5 is a view showing a location of a main board in a basic mode and an extended mode of a mobile terminal.

FIG. 5 is a view showing a location of a main board 181 in the basic mode and extended mode of the mobile terminal 100.

When the first frame 101 and the second frame 102 are arranged vertically and the first frame 101 moves upward, the user maintains a state of holding the second frame 102, so that when many parts are mounted on the first frame 101, a center of gravity is biased upwards.

Therefore, in the mobile terminal 100 of the present disclosure, most components may be mounted on the second frame, and only some of components located at an upper end may be disposed on the first frame 101.

For example, a receiver 152 that outputs sound, a camera 121*a* that takes a front image, the proximity sensor 141, and the like may be located at an upper portion of the first frame 101, and may be fixed to the first frame 101 and located at an upper portion of the mobile terminal 100 when the mobile terminal 100 is extended.

In addition, a driving IC that drives the display unit 151 may be connected to an end of the display unit 151 via a flexible substrate.

The variable part of the display unit 151 should be bent such that the driving IC slides together as the variable part slides and changes a location thereof relative to the second frame 102 or that a length of the flexible substrate connected to the driving IC is varied.

Therefore, connecting the driving IC to the fixed part located on the first frame 101 of the display unit 151 may be more stable than connecting the driving IC to the variable part, and the driving IC may be mounted on the first frame 101.

The components mounted on the second frame 102 may include a battery 191, the main board 181, drivers 201, 202, and 203, an I/O port 161, a rear camera 121*b*, and the like.

The battery 191 provides power to each component of the mobile terminal 100, and the main board 181 is connected to various electronic components to take charge of overall control of the mobile terminal 100. The I/O port 161 connected to the main board 181 and the battery 191 to receive external data and power may be formed on the second frame 102 where the main board 181 and the battery 191 are located.

The drivers 201, 202, and 203 may provide driving forces to the first frame 101 and the second frame 102 to change the size of the mobile terminal 100, and the drivers 201, 202, and 203 may include a motor that provides a rotational force and rack and pinion gears that change the rotational force of the motor to a linear motion. Among the drivers 201, 202, and 203, the heaviest motor may be located on the second frame 102, and the rack gear 203 extending in the first direction may be located on the first frame 101.

The motor and the pinion gear 202 of the drivers 201, 202, and 203, a housing of the drivers 201, 202, and 203, and the like may be located on the second frame 102.

As shown in FIG. 3, the first frame 101 of the present embodiment is located in front of the second frame 102 in the basic mode and is not exposed in the rearward direction, so that the rear camera 121*b* may be located on the second frame 102. The rear camera 121*b* may be disposed on the first frame 101 as a portion of a rear surface of the first frame 101 is exposed.

Because the battery 191 and the main board 181, which occupy most of a weight of the mobile terminal 100, are located on the second frame 102, the mobile terminal 100 has an advantage that the center of gravity may be located at a lower side even in the extended mode.

Hereinafter, for convenience of description, an electronic component located at the upper side is referred to as a first electronic component, and an electronic component located at the lower side is referred to as a second electronic component. The first electronic component may include at least one of the front camera 121*a*, the receiver 152, the driving IC of the display unit 151, and the proximity sensor 141. The second electronic component may include the battery 191 and the main board 181, and other electronic components other than the first electronic component.

The first electronic component and the second electronic component need to be connected to each other, and in particular, the first electronic component needs to be connected to the main board 181 and the battery 191.

A coaxial cable or the flexible substrate may be used to connect the first electronic component and the main board 181 to each other. The coaxial cable or the flexible substrate may be made of a material that may be bent, and a shape thereof and a distance between both ends thereof may be changed based on a change in the mode of the mobile terminal 100.

However, for the bending deformation to occur stably, a sufficient space must be provided such that a bendable portion is not disconnected as a force is applied thereto, but it is difficult to secure the sufficient space in a limited space of the mobile terminal 100 of the present disclosure. Therefore, defects such as the disconnection may occur in the coaxial cable or the flexible substrate that connects the first electronic component and the second electronic component to each other.

To perform data communication between the first electronic component and the second electronic component using wireless communication rather than a physical connection scheme, a horn antenna may be used in the present disclosure.

Figure 6:
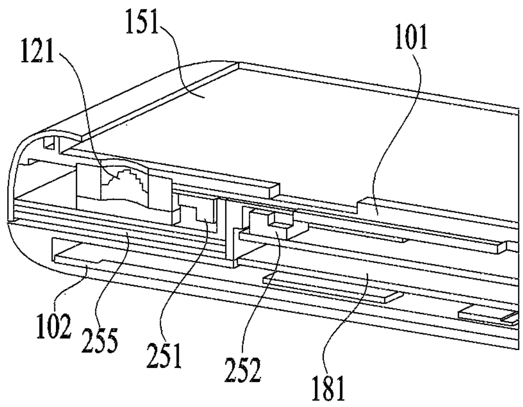
FIG. 6 shows cross-sectional views taken along lines A-A and B-B in FIG. 2.
Figure 6:
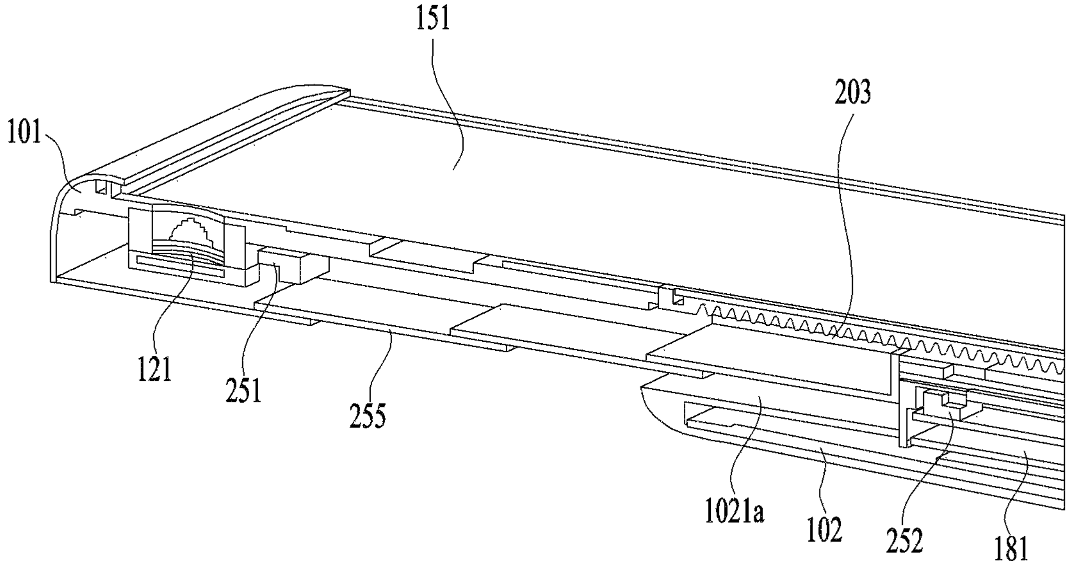

FIG. 6 shows cross-sectional views taken along lines A-A and B-B in FIG. 2. The horn antenna is located at a center in the left and right direction of the mobile terminal 100. The horn antenna may radiate a signal in a specific direction using a horn structure that gradually widens in a tapered shape.

The horn antenna of the present disclosure may include a first horn antenna 251 located on the first frame 101 and a second horn antenna 252 located on the second frame 102. The first horn antenna 251 and the second horn antenna 252 may be respectively disposed to be oriented in the first direction and the second direction to face each other, the first horn antenna 251 may be disposed to be oriented in the first direction (the downward direction), and the second horn antenna 252 may be disposed to be oriented in the second direction (the upward direction).

When the first frame 101 is constructed as a thin plate located in front of the second frame 102 as shown in (b) in FIG. 3, the first horn antenna 251 may be located on the rear surface of the first frame 101 and an antenna cover 255 that covers the first horn antenna 251 may have a shape protruding from the rear surface of the first frame 101.

The second frame 102 may include a concave portion 1021*a* recessed from the top such that the antenna cover 255 is accommodated therein, and the second horn antenna 252 may be disposed to face the first horn antenna 251 at an end of the concave portion 1021*a*.

The horn antenna may use a wireless gigabit alliance (WiGig) communication scheme for transmitting an ultra-high frequency signal in a 60 GHz band. The signal of the WiGig may have a short operating distance in a range from 3.3 m to 10 m, but may transmit large amounts of data (from 6.75 Gbps to 20 Gbps).

Because the data transmitted to the display unit 151 has a large capacity, a communication speed equal to or higher than 3 Gbps is required, and because the data is transmitted between the first frame 101 and the second frame 102, the horn antenna may be used when operating at a transmission distance of several cm.

The horn antenna is an antenna type having more directivity than an array antenna. Energy consumption may be reduced and a transmission efficiency may be increased by transmitting the signal only to the receiver located in the specific direction using the horn antenna.

Figure 7:
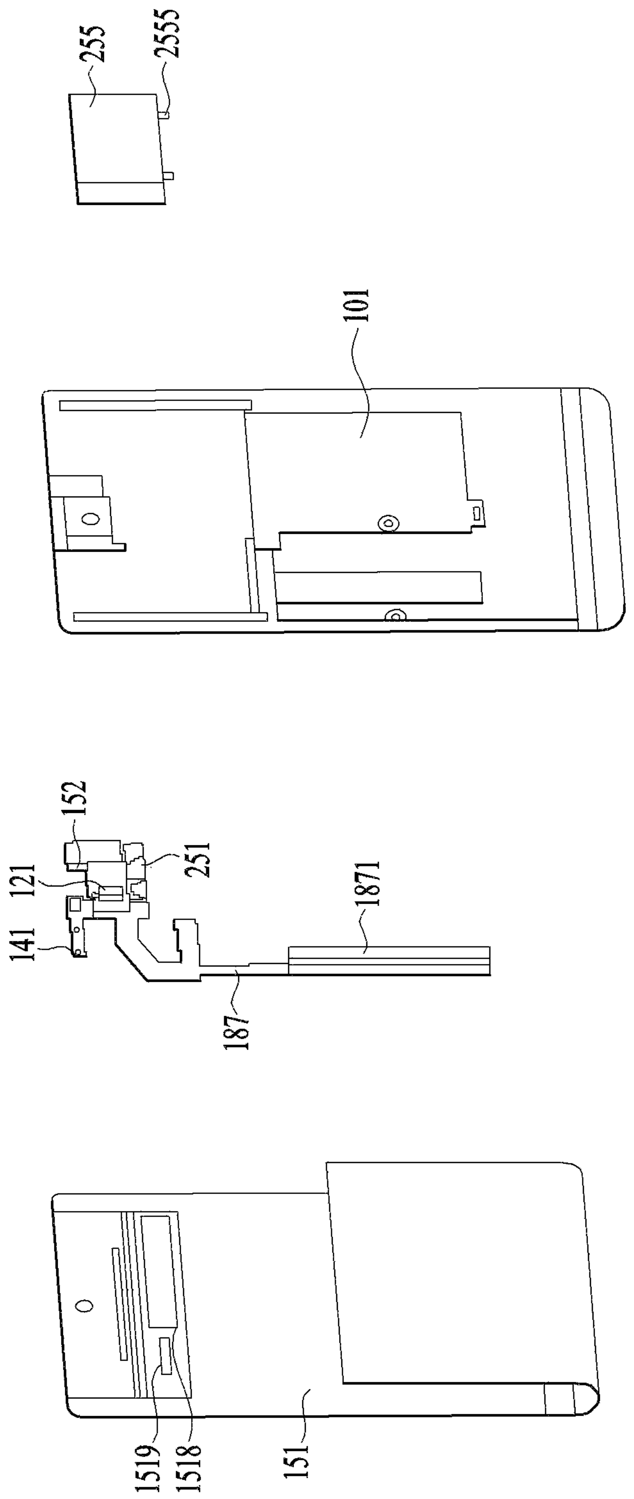
FIG. 7 is an exploded view showing a first frame and a display unit of a mobile terminal.
Figure 8:
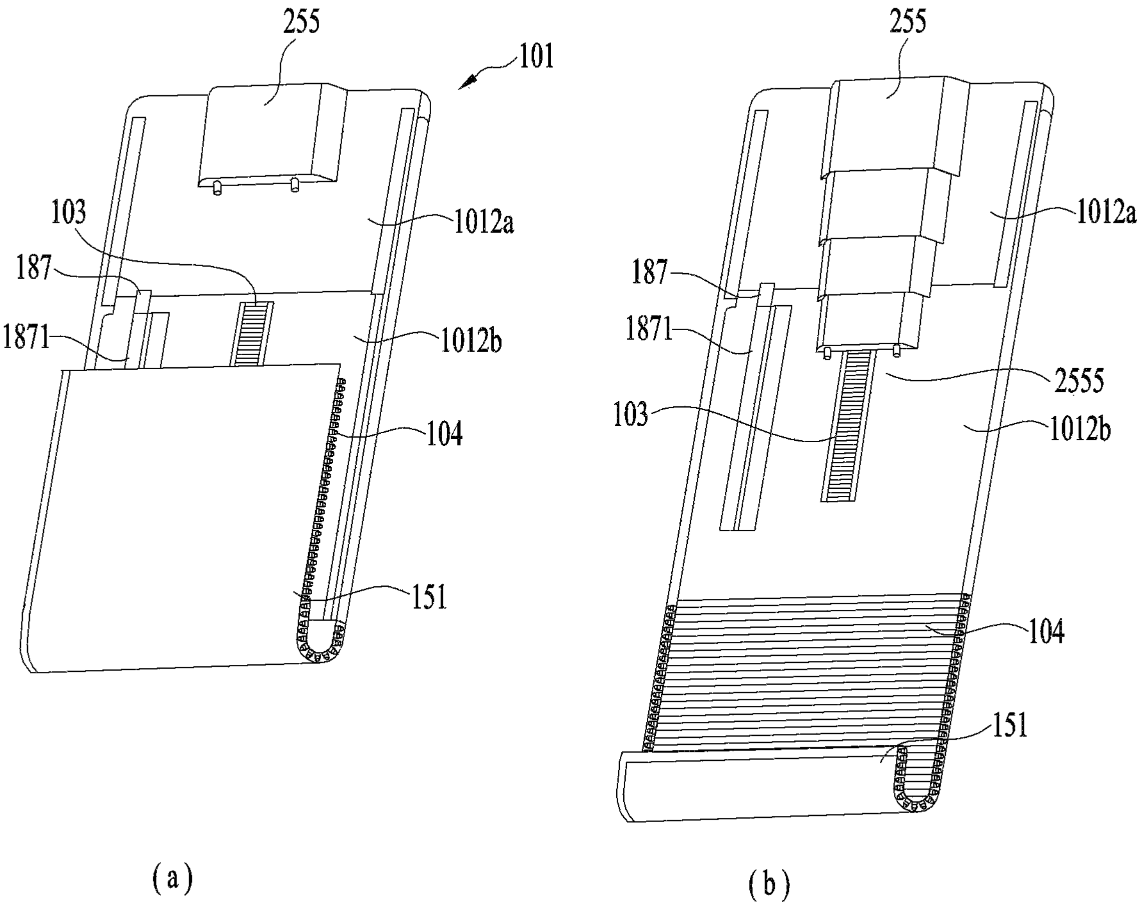
FIG. 8 is a rear view showing a first frame and a display unit of a mobile terminal.

FIG. 7 is an exploded view showing the first frame 101 and the display unit 151 of the mobile terminal 100, and FIG. 8 is a rear view showing the first frame 101 and the display unit 151 of the mobile terminal 100.

The flexible substrate bent at an upper end of the fixed part of the display unit 151 and located on the rear surface of the display unit 151, the driving IC, and a data port 1519 for inputting and outputting data are shown.

An auxiliary board 187 on which the first horn antenna 251, the front camera 121*a*, the receiver 152, and the proximity sensor 141 are mounted may be connected to the data port 1519 so as to be connected to the driving IC.

The first frame 101 may be coupled to the rear surface of the fixed part of the display unit 151, and a portion of the auxiliary substrate 187 may be located on the rear surface of the first frame 101 and the remaining portion thereof may be located on a front surface of the first frame 101.

The auxiliary board 187 may pass through an opening defined in the first frame 101 using the flexible substrate, so that the portion thereof may be located on the front surface and the remaining portion thereof may be located on the rear surface. Because a bent portion does not occur in the auxiliary board 187 based on the slide movement of the second frame 102, and the auxiliary board 187 remains fixed to the first frame 101, the auxiliary board 187 is not disconnected by repeated extension and contraction operations of the mobile terminal 100.

The auxiliary board 187 may be disposed between the first frame 101 and the display unit 151 such that the auxiliary board 187 is not exposed to the upper portion of the first frame 101 that is exposed in the rearward direction in the extended mode, a first rear surface.

However, the camera, the first horn antenna 251, the receiver 152, and the like are not able to be located on the front surface of the thin plate-shaped first frame 101 because of thicknesses thereof, so that the above components may be disposed on the rear surface of the first frame 101. The first electronic component located on the rear surface of the first frame 101 is covered with the antenna cover 255 and is not exposed to the outside.

The opening may be defined in the first frame 101 such that the portion of the auxiliary board 187 is located on the rear surface of the first frame 101 and the remaining portion thereof is located on the front surface of the first frame 101 and that the auxiliary board 187 passes therethrough.

The horn antenna uses the ultra-high frequency signal and has linearity, so that when an object such as a finger is located between the first horn antenna 251 and the second horn antenna 252 or an electromagnetic component is disposed in close proximity, the signal may be affected and thus wireless communication may not be smoothly achieved.

In the basic mode, the first horn antenna 251 is accommodated in the concave portion 1021*a* of the second frame 102 and is disposed adjacent to the second horn antenna 252 as shown in (a) in FIG. 6 to exclude external factors affecting the wireless communication.

However, as shown in (b) in FIG. 6, in the extended mode, the first horn antenna 251 protrudes upward from the second frame 102, and the first horn antenna 251 and the second horn antenna 252 are spaced apart from each other.

When a user's hand is located or a product is located in another magnetic field, the wireless communication between the first horn antenna 251 and the second horn antenna 252 may not be achieved smoothly.

In the extended mode, the antenna cover 255 may be extended and contracted such that the interfering object (especially the user's finger) is not located between the first horn antenna 251 and the second horn antenna 252. In the extended mode, the antenna cover 255 may be extended in the first direction as shown in (b) in FIG. 8, and constitute a shielded passage between the first horn antenna 251 and the second horn antenna 252 as shown in (b) in FIG. 6.

The antenna cover 255 may be constructed in a multi-stage shell structure, and shells overlapping each other in the basic mode as shown in (a) in FIG. 6 may be spread in the extended mode as shown in (b) in FIG. 6. One end of the antenna cover 255 may be fixed to the first frame 101 and the other end thereof may be fixed to the concave portion of the second frame 102, and a protrusion 2555 for fixing the other end of the antenna cover 255 to the concave portion may protrude from the other end of the antenna cover 255.

The antenna cover 255 is composed of the shells made of a non-conductive material so as not to interfere with the wireless communication between the first horn antenna 251 and the second horn antenna 252, and thus, does not affect the wireless communication between the first horn antenna 251 and the second horn antenna 252.

Excluding the other end of the antenna cover 255, electro magnetic interference (EMI) paint may be applied to inner surfaces of the shells for shielding coating. The shielding coating may prevent the signal from the horn antenna from escaping to the outside and prevent an external signal from entering a space between the pair of horn antennas.

As shown in (b) in FIG. 8 and (b) in FIG. 6, the antenna cover 255 extended in the extended mode may overlap the rack gear 203 located on the rear surface of the first frame 101. The antenna cover 255 may prevent the rack gear 203 from being exposed to the outside.

Among the rear surfaces of the first frame 101, a second rear surface that is not exposed to the outside is a portion not exposed to the outside because the second frame 102 is located at the rear even in the extended mode, and is able to be located such that a power terminal 1871 is exposed in a direction of the rear surface of the first frame 101.

Figure 9:
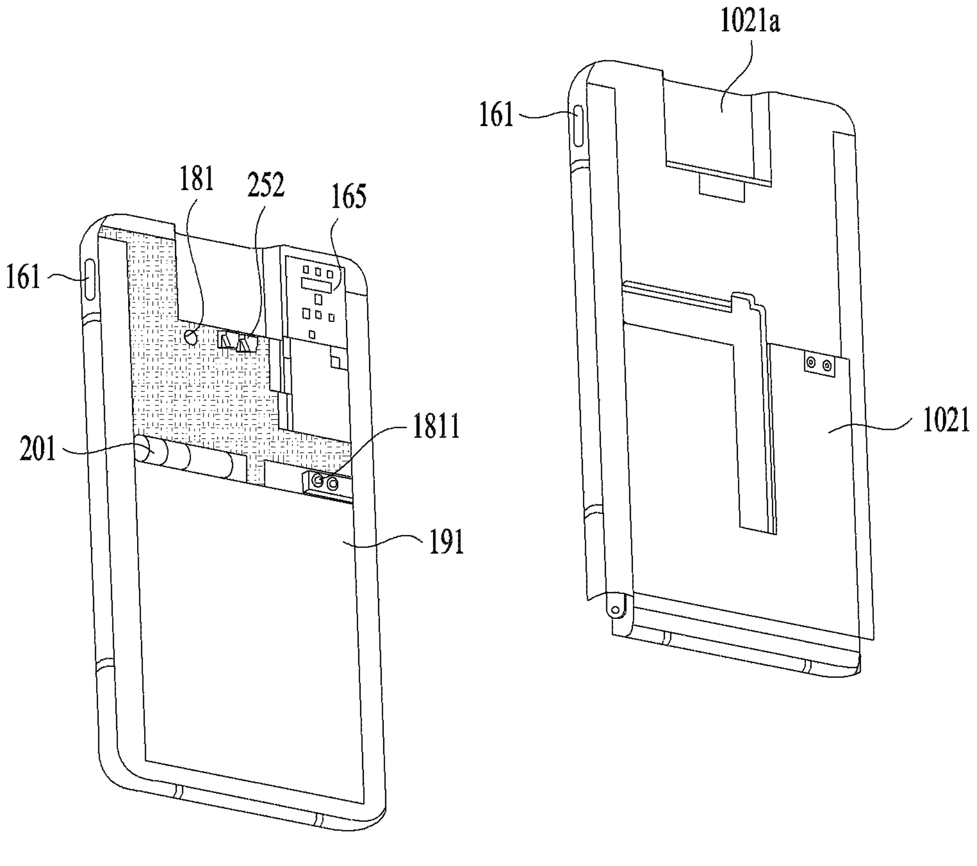
FIG. 9 is an exploded view showing a state in which a front portion of a second frame of a mobile terminal is removed.

The power terminal 1871 is connected to the battery 191 of the second frame 102 to supply power to the first electronic component mounted on the first frame 101. FIG. 9 is an exploded view showing a state in which a front portion of the second frame 102 of the mobile terminal 100 is removed.

As shown in FIG. 9, a power pin 1811 connected to the battery 191 may be exposed at a front surface of the second frame 102. The power pin 1811 may be formed in an elastic form like a pogo pin.

Figure 10:
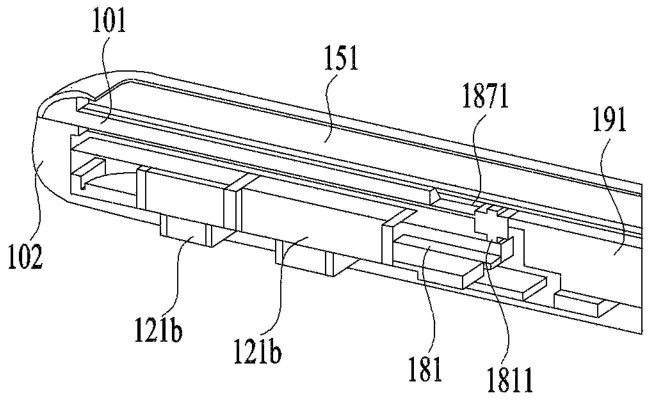
FIG. 10 shows cross-sectional views taken along lines C-C and D-D in FIG. 2.
Figure 10:
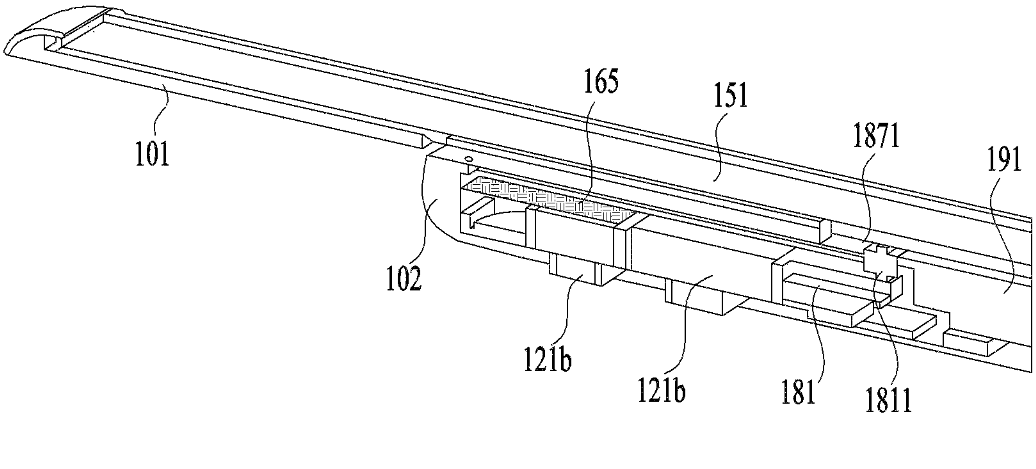

FIG. 10 shows cross-sectional views taken along lines C-C and D-D in FIG. 2. As a portion where the power pin 1811 and the power terminal 1871 are located, the power pin 1811 may remain in contact with the power terminal 1871 when the second frame 102 slides.

The power terminal 1871 may have a shape elongated in the first direction, which is the slide movement direction, to maintain the state of being in contact with the power pin 1811 during the slide movement. A length of the power terminal 1871 may be equal to or greater than the movement distance of the second frame 102 in the first direction.

As shown in FIG. 9, the battery 191 may be located at the lower portion of the second frame 102, and the main board 181 may be disposed at the upper portion thereof. When a mounting space is insufficient, as shown in FIG. 10, the main board 181 may be constituted by stacking boards in two layers.

On the main board 181, ICs related to various driving including an AP may be mounted, and an I/O terminal for receiving external power and data, a card slot 165 into which a memory card and a USIM card are inserted, the rear camera 121*b*, and the like may be mounted.

As shown in FIG. 10, only one board may be used or the board may be partially omitted at a location where a thick component such as the camera 121*b* is mounted. The power pin 1811 may also be mounted on the main board 181, and may be connected to the battery 191 and the power terminal 1871 via the main board 181.

The motor of the drivers 201, 202, and 203 may be located between the main board 181 and the battery 191. When the motor is located at the upper portion of the second frame 102, the rack gear 203 may be exposed to the outside, so that the motor may be disposed in the middle. The pinion gear 202 rotating by the rotational force of the driving motor 201 may maintain a state of being engaged with an upper side of the rack gear 203 in the basic mode, and may maintain a state of being engaged with a lower side of the rack gear 203 in the extended mode.

In the mobile terminal 100 according to one embodiment of the present disclosure, the data signal between the first electronic component mounted on the first frame 101 and the second electronic component mounted on the second frame 102 may transmit the large capacity of data at the high speed using the horn antenna.

By omitting the flexible substrate or the coaxial cable, which is the physical signal connection means, a space where the flexible substrate and the coaxial cable are folded may be saved, and the disconnection problem may be solved.

In addition, because the power may be transmitted in a physical manner without a bending structure using the power terminal 1871 and the power pin 1811, the power may be stably supplied to the first electronic component. While the present disclosure has been described and illustrated herein with reference to the preferred embodiments of the mobile terminal 100 according to an embodiment of the present disclosure, the present disclosure is non-limited by the embodiments disclosed herein but intends to give a broadest scope matching the principles and new features disclosed herein. It will be appreciated by those skilled in the art that various modifications and variations can be made in the present specification without departing from the spirit or scope of the disclosure. Thus, it is intended that the present specification covers the modifications and variations of this disclosure provided they come within the scope of the appended claims and their equivalents.

What is claimed is:

1. A mobile terminal comprising:

a first frame;

a second frame configured to switch to an extended mode by sliding in a first direction with respect to the first frame or to switch to a basic mode by sliding in a second direction opposite to the first direction;

a main board mounted on the second frame;

a first electronic component mounted on the first frame;

a first antenna fixed to a rear surface of the first frame and oriented in the first direction;

an auxiliary board configured to connect to the first electronic component and the first antenna; and a second antenna located on the main board and oriented in the second direction to face the first antenna, wherein the second antenna is in wireless communication with the first antenna; and an antenna cover located on the rear surface of the first frame and covering the first antenna and a gap between the first antenna and the second antenna to form a shielding passage between the first antenna and the second antenna.

2. The mobile terminal claim 1, wherein the antenna cover protrudes from a rear surface of the first frame, and wherein the second frame further includes a concave portion receiving the antenna cover therein in the basic mode.

3. The mobile terminal of claim 1, wherein the antenna cover includes a multi-stage structure with stages overlapping each other in the basic mode and spreading while sliding in the extended mode, and wherein one side of the multi-stage structure is fixed to the first frame and the other side of the multi-stage structure is fixed to the second frame.

4. The mobile terminal of claim 3, further comprising:

a driving motor located on the second frame;

a pinion gear configured to receive a rotational force of the driving motor; and a rack gear located on the rear surface of the first frame, wherein at least a portion of the rack gear is located in front of the antenna cover in the extended mode.

5. The mobile terminal of claim 3, wherein the antenna cover includes:

multi-stage shells made of a non-conductive material; and

EMI paint applied to inner sides of the multi-stage shells.

6. The mobile terminal of claim 2, wherein the second antenna is mounted on the second frame to be oriented in the second direction opposite to the first direction at an end of the concave portion.

7. The mobile terminal of claim 1, wherein the first electronic component is mounted on the first frame and includes at least one of a camera, a receiver, and a proximity sensor located inside the antenna cover.

8. The mobile terminal of claim 1, further comprising:

a battery mounted on the second frame;

a power pin connected to the battery and protruding from a front surface of the second frame facing the first frame; and a power terminal located on the auxiliary board, wherein the power pin contacts to the power terminal and moves along the power terminal when the second frame slides.

9. The mobile terminal of claim 8, wherein the power terminal is elongated in the first direction.

10. The mobile terminal of claim 9, wherein the first frame includes:

a first rear surface exposed to the outside in the extended mode; and a second rear surface covered by the second frame in the extended mode, wherein the power terminal is located on the second rear surface.

11. The mobile terminal of claim 1, further comprising:

a display unit including a fixed part coupled to a front surface of the first frame and a variable part oriented in the first direction of a first area and bent while surrounding the second frame; and a display driving IC fixed to the first frame and connected to the auxiliary board.

12. The mobile terminal of claim 1, wherein the first antenna and the second antenna include horn antennas using a WiGig communication in a 60 GHz band.

13. A mobile terminal comprising:

a first frame;

a second frame configured to switch to an extended mode by sliding in a first direction with respect to the first frame or to switch to a basic mode by sliding in a second direction opposite to the first direction;

a main board mounted on the second frame;

a first electronic component mounted on the first frame;

an auxiliary board configured to connect the first electronic component;

a battery mounted on the second frame;

a power pin connected to the battery and protruding from a front surface of the second frame facing the first frame; and a power terminal elongated in the first direction on the auxiliary board, wherein the power pin contacts to the power terminal and moves along the power terminal when the second frame slides, wherein the first frame includes:

a first rear surface exposed to the outside in the extended mode; and a second rear surface covered by the second frame in the extended mode, and wherein the power terminal is located on the second rear surface.

14. The mobile terminal of claim 13, further comprising:

a first antenna fixed to the first frame and connected to the auxiliary board; and a second antenna located on the main board.

* * * * *